United States Patent [19]

Harms et al.

[11] 4,332,938
[45] Jun. 1, 1982

[54] ANTHAQUINONE REACTIVE DYESTUFFS, THEIR PREPARATION AND THEIR USE FOR DYEING MATERIALS CONTAINING OH GROUPS OR AMIDE GROUPS

[75] Inventors: Wolfgang Harms; Klaus Wunderlich, both of Leverkusen; Klaus von Oertzen, Cologne, all of Fed. Rep. of Germany

[73] Assignee: Bayer Aktiengesellschaft, Leverkusen, Fed. Rep. of Germany

[21] Appl. No.: 99,120

[22] Filed: Nov. 30, 1979

[30] Foreign Application Priority Data

Dec. 16, 1978 [DE] Fed. Rep. of Germany ....... 2854483

[51] Int. Cl.³ ............................................. C07D 251/00
[52] U.S. Cl. ......................................... 544/189; 8/549; 8/676; 8/677; 8/679; 8/917; 8/918; 8/924
[58] Field of Search ......................................... 544/189

[56] References Cited

U.S. PATENT DOCUMENTS

| | | | |
|---|---|---|---|
| 3,558,620 | 1/1971 | Bien et al. | 544/189 |
| 3,558,621 | 1/1971 | Bien et al. | 544/189 |
| 4,129,736 | 12/1978 | Begrich | 544/189 |
| 4,198,205 | 4/1980 | Elser et al. | 544/189 X |
| 4,273,553 | 6/1981 | Harms et al. | 544/189 X |

FOREIGN PATENT DOCUMENTS 471207  5/1969  Switzerland ................ 544/189 UX

*Primary Examiner*—Paul F. Shaver
*Attorney, Agent, or Firm*—Sprung, Horn, Kramer & Woods

[57] ABSTRACT

Dyestuffs of the formula

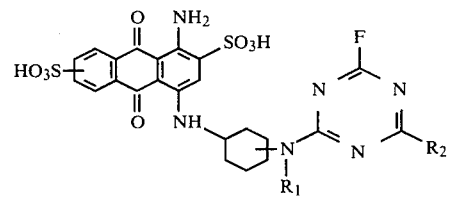

wherein
$R_1$ and $R_2$ have the meaning given in the description, and their use for dyeing and printing materials containing hydroxyl groups or amide groups, such as textile fibres, filaments and fabrics of wool, silk or synthetic polyamide or polyurethane fibres, and for dyeing and printing natural or regenerated cellulose with dyeings and prints which are fast to washing. The dyeings obtained are distinguished by good fastness to light and wet processing.

7 Claims, No Drawings

ANTHAQUINONE REACTIVE DYESTUFFS, THEIR PREPARATION AND THEIR USE FOR DYEING MATERIALS CONTAINING OH GROUPS OR AMIDE GROUPS

The present invention relates to reactive dyestuffs of the formula

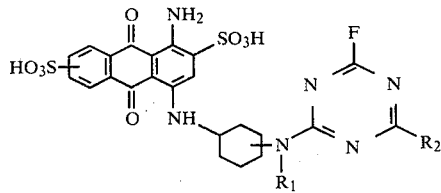

wherein
$R_1$ = H or a substituent and
$R_2$ = a substituent.

Particularly suitable radicals $R_1$ are, in addition to H, optionally substituted $C_1$-$C_4$-alkyl, such as $CH_3$, $C_2H_5$, $CH_2$—$CH_2OH$, $CH_2$—$CH_2$—$OSO_3H$, $CH_2$—$CH_2$—$COOH$ and $CH_2$—$COOH$.

Examples of suitable substituents $R_2$ are alkyl, aryl, amino, alkylamino, dialkylamino, arylamino, aralkylamino and alkoxy. The radicals mentioned can contain other customary substituents and the alkyl and alkoxy radicals preferably contain 1-4 C atoms.

Specific suitable alkyl radicals $R_2$ which may be mentioned are $CH_3$, $C_2H_5$, $C_3H_7$ and $C_4H_8$, and specific suitable aryl radicals $R_2$ which may be mentioned are phenyl and substituted phenyl radicals, such as o-, m- or p-methylphenyl and o-, m- or p-chlorophenyl.

Suitable amine radicals $R_2$ are, in addition to $NH_2$, monoalkylamino groups, such as $NHCH_3$, NH—$C_2H_5$, NH—$C_3H_7$, NH—$C_4H_9$, NH—$CH_2$—$CH_2$—OH, NH—$CH_2$—$CH_2$—$OSO_3H$, NH—$CH_2$—$CH_2$—$SO_3H$, NH—$CH_2$—COOH, NH—$CH_2$—$CH_2$—$OCH_3$, NH—$CH_2$—$CH_2$—$OC_2H_5$ or NH—$CH_2$—CH(OH)—$CH_2$—OH, and diakylamino groups, such as $N(CH_3)_2$, $N(C_2H_5)_2$, $N(CH_3)C_2H_5$, $N(CH_3)C_3H_7$, $N(CH_3)$—$CH_2$—$CH_2OH$, $N(CH_2$—$CH_2OH)_2$,

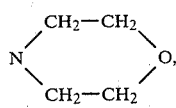

$N(CH_2$—$CH_2$—$SO_3H)_2$, $N(CH_2$—$COOH)_2$, $N(CH_3)$—$CH_2$—$CH_2$—$SO_3H$, $N(CH_3)$—$CH_2$—$CH_2$—$OSO_3H$, $N(CH_3)$—$CH_2$—$SO_3H$ and $N(CH_3)$—$CH_2$—COOH.

Examples of suitable arylamino and aralkylamino groups $R_2$ are phenylamino, 2-, 3- or 4-sulphophenylamino, 2,4-, 2,5-, 3,5- or 3,4-disulphophenylamino, 2-, 3- or 4-carboxyphenylamino, 2-carboxy-4- or -5-sulphophenylamino, 3-carboxy-5-sulphophenylamino, 2-methyl-4,5-disulphophenylamino, 4-methyl-2- or -3-sulphophenylamino, 2-methyl-4- or -5-sulphophenylamino, 2,6-dimethyl-3- or -4-sulphophenylamino, 2,4-dimethyl-6-sulphophenylamino, 2-chloro-4- or -5-sulphophenylamino, 3-chloro-2-methyl-6-sulphophenylamino, 4-methoxy-2- or -3-sulphophenylamino, 2-methoxy-5-sulphophenylamino, 2-($\beta$-hydroxethoxy)-5-sulphophenylamino, 4-($\beta$-hydroxyethoxy)-2- or -3-sulphophenylamino, 4-sulphomethylphenylamino, 2-, 3- or 4-methylphenylamino, 2-, 3- or 4-chlorophenylamino, 2-, 3- or 4-methoxyphenylamino, 3- or 4-nitrophenylamino, 2-, 3- or 4-acetylaminophenylamino, 4-N-methyl-N-acetylphenylamino, N-methylphenylamino, N-methyl-2-methyl-5-sulphophenylamino, N-methyl-3-sulphophenylamino, N-($\beta$-hydroxyethyl)-phenylamino, N-ethylphenylamino, N-$\beta$-sulphoethyl-phenylamino, 1-, 3-, 4-, 5-, 6-, 7- or 8-sulpho-2-naphthylamino, 2-, 3-, 4-, 5-, 6-, 7- or 8-sulpho-1-naphthylamino, 1,5-, 2,6-, 4,8-, 5,7- or 6,8-disulpho-2-naphthylamino, 2,4-, 3,7-, 3,8-, 4,8-5,7- or 6,8-disulpho-1-naphthylamino, 1,5,7- or 3,6,8-trisulpho-2-naphthylamino and 3,5,7- or 3,6,8-trisulpho-1-naphthylamino.

Examples of suitable aralkylamino radicals $R_2$ are benzylamino, 2-phenylethylamino, 2-(1-phenylpropyl)-amino, 2-, 3- or 4-sulphobenzylamino, 2-(2-, 3- or 4-sulphophenyl)-ethylamino, N-methyl-N-benzylamino and N-ethyl-N-benzylamino.

Examples of suitable alkoxy radicals $R_2$ are $OCH_3$, $OC_2H_5$, $OC_3H_7$, $OC_4H_9$, O—$CH_2$—$CH_2$—OH, O—$CH_2$—$CH_2$—$OCH_3$, O—$CH_2$—$CH_2$—$OC_2H_5$, O—($CH_2$—$CH_2$—O)$_2$—H, O—($CH_2$—$CH_2$—O)$_3$—H, O—$CH_2$—$CH_2$—Cl, O—$CH_2$—$CH_2$—O—$C_6H_5$, O—$CH_2$—$CH_2$—$C_6H_5$ and

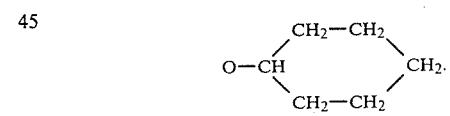

Preferred dyestuffs within the scope of the formula (I) are those of the formulae

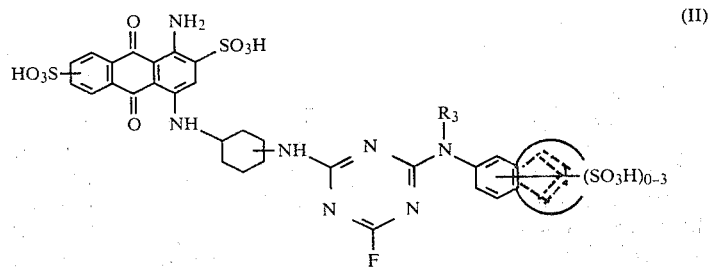

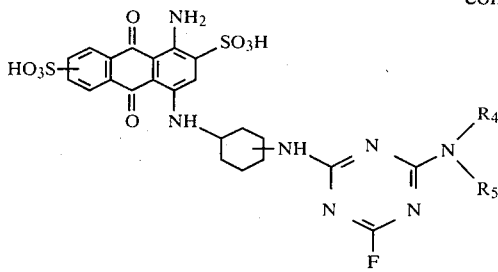

(III)

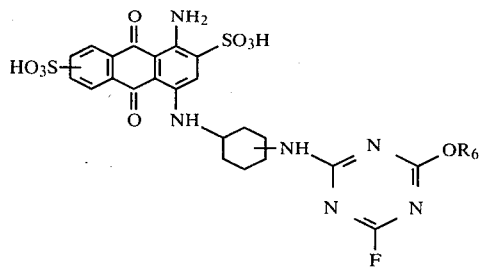

(IV)

wherein
$R_3$ = H or optionally substituted $C_1$-$C_2$-alkyl,
$R_4$ and $R_5$ = H or optionally substituted $C_1$-$C_4$-alkyl and
$R_6$ = optionally substituted $C_1$-$C_6$-alkyl.

The new dyestuffs are obtained by a process in which aminocyclohexylamino compounds of the formula

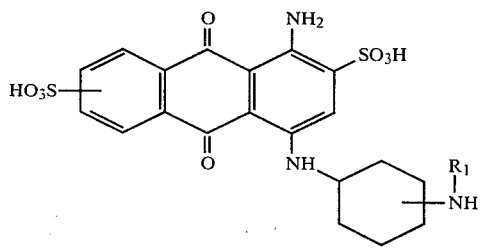

(V)

wherein
$R_1$ has the abovementioned meaning,
are subjected to condensation reactions with difluorotriazinyl compounds of the formula

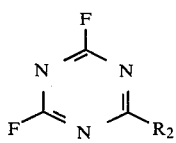

(VI)

wherein
$R_2$ has the abovementioned meaning.

Examples of compounds of the formula (VI) which are suitable for the condensation reaction are: 2,4-difluoro-6-methyl- or -6-ethyl-triazine, 2,4-difluoro-6-phenyltriazine, 2,4-difluoro-6-aminotriazine, 2,4-difluoro-6-methylaminotriazine, 2,4-difluoro-6-ethylaminotriazine, 2,4-difluoro-6-dimethyl- or -6-diethylaminotriazine, 2,4-difluoro-6-methylethylaminotriazine, 2,4-difluoro-6-isopropylamino-triazine, 2,4-difluoro-6-butylamino-triazine, 2,4-difluoro-6-(β-hydroxyethylamino)-triazine, 2,4-difluoro-6-bis-(β-hydroxyethyl)-amino-triazine, 2,4-difluoro-6-(N-methyl-N-β-hydroxyethylamino)-triazine, 2,4-difluoro-6-benzylaminotriazine, 2,4-difluoro-6-(β-phenylethylamino)-triazine, 2,4-difluoro-6-(N-methyl-N-sulphomethylamino)-triazine, 2,4-difluoro-6-phenylamino-triazine, 2,4-difluoro-6-(2'-, 3'- or 4'-methylphenylamino)-triazine, 2,4-difluoro-6-(2'-, 3'- or 4'-chloro-phenylamino)-triazine, 2,4-difluoro-6-(2'-, 3'- or 4'-methoxy-phenylamino)-triazine, 2,4-difluoro-6-(3'- or 4'-nitrophenylamino)-triazine, 2,4-difluoro-6-(3'- or 4'-acetylamino-phenylamino)-triazine, 2,4-difluoro-6-(4'-N-methyl-N-acetylamino-phenylamino)-triazine, 2,4-difluoro-6-N-methyl-phenylamino-triazine, 2,4-difluoro-6-[N-(β-hydroxyethyl)-phenylamino]-triazine, 2,4-difluoro-6-N-ethyl-phenylamino-triazine, 2,4-difluoro-6-(2'-, 3'- or 4'-sulphophenylamino)-triazine, 2,4-difluoro-6-(2',4'-, 2',5'-, 3',4'- or 3',5'-disulphophenylamino)-triazine, 2,4-difluoro-6-(1',5'-, 2',6'-, 4',8'-, 5',7'- or 6',8'-disulpho-2'-naphthylamino)-triazine, 2,4-difluoro-6-(2',4'-, 3',7'-, 3',8'-, 5',7'- or 6',8'-disulpho-1'-naphthylamino)-triazine, 2,4-difluoro-6-(1',5',7'- or 3',6',8'-trisulpho-2'-naphthylamino)-triazine, 2,4-difluoro-6-(3',5',7'-trisulpho-1'-naphthylamino)-triazine, 2,4-difluoro-6-(2'-, 3'- or 4'-carboxyphenylamino)-triazine, 2,4-difluoro-6-(2'-carboxy-4'- or -5'-sulphophenylamino)-triazine, 2,4-difluoro-6-(3'-carboxy-5'-sulphophenylamino)-triazine, 2,4-difluoro-6-(2'-methyl-4'- or -5'-sulphophenylamino)-triazine, 2,4-difluoro-6-(4'-methyl-2'- or -3'-sulphophenylamino)-triazine, 2,4-difluoro-6-(2'-methyl-4',5'-disulphophenylamino)-triazine, 2,4-difluoro-6-(2',6'-dimethyl-3'-sulpho- or 2',4'-dimethyl-6'-sulpho-phenylamino)-triazine, 2,4-difluoro-6-(4'-methoxy-2'-sulpho- or -4'-methoxy-3'-sulpho- or -2'-methoxy-5'-sulpho-phenylamino)-triazine, 2,4-difluoro-6-(2'-β-hydroxyethoxy-5'-sulpho- or -4'-β-hydroxyethoxy-2'-sulpho- or -4'-β-hydroxyethoxy-3'-sulpho-phenylamino)-triazine, 2,4-difluoro-6-(2'-, 3'- or 4'-sulphophenyl-methylamino)-trazine, 2,4-difluoro-6-(2'-carboxy-5'-sulphophenyl-methylamino)-triazine, 2,4-difluoro-6-(3'- or 4'-sulphomethyl-phenylamino)-triazine, 2,4-difluoro-6-[N-(sulphomethyl)-phenylamino]-triazine, 2,4-difluoro-6-[3'-sulpho-N-(carboxymethyl)-phenylamino]-triazine, 2,4-difluoro-6-methoxy-triazine, 2,4-difluoro-6-ethoxy-triazine, 2,4-difluoro-6-β-methoxy-ethoxy-triazine, 2,4-difluoro-6-β-ethoxy-ethoxy-triazine, 2,4-difluoro-6-benzyloxytriazine, 2,4-difluoro-6-β-hydroxyethoxy-triazine and 2,4-difluoro-6-β-phenoxy-ethoxy-triazine.

The reaction of the aminocyclohexylaminoanthraquinone compounds (V) with the 6-substituted 2,4-difluorotriazines (VI) is carried out in an aqueous or organic-aqueous medium at temperatures of −10° to 80°, preferably at 0°–50°, and at pH values of 5–11, preferably 7.0–10.0, in the presence of alkaline condensing agents, such as aqueous alkali metal hydroxide solutions, alkali metal carbonate solutions or alkali metal phosphate solutions.

The 6-substituted 2,4-difluorotriazines (VI) can be prepared either by subjecting cyanuric fluoride to a condensation reaction with compounds containing active hydrogen, of the general formula

$$H-R_2 \qquad (VII)$$

wherein $R_2$ has the abovementioned meaning,
in an aqueous, aqueous-organic or organic medium in the presence of basic condensing agents, such as, for example, aqueous alkali metal hydroxide solutions, alkali metal carbonate solutions, alkali metal bicarbonate solutions or alkali metal phosphate solutions or N,N-dialkylanilines or trialkylamines, or by replacing chlorine in 6-substituted 2,4-dichlorotriazines by fluorine by means of alkali metal fluorides in organic solvents or by means of anhydrous hydrofluoric acid.

According to another preparation procedure, the new reactive dyestuffs (I) are also obtained by reacting the aminocyclohexylaminoanthraquinone compounds (V) with 2,4,6-trifluorotriazine in an aqueous or aqueous-organic or organic medium to give intermediate products of the formula

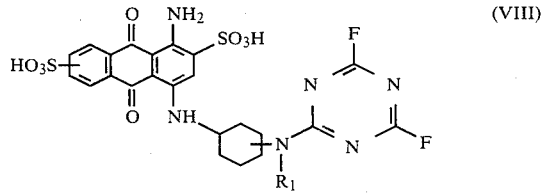

(VIII)

wherein $R_1$ has the abovementioned meaning,
and subjecting the reactive intermediate products to a condensation reaction with the compounds of the general formula (VII) in a second reaction step.

The new dyestuffs are extremely valuable products which are suitable for the most diverse applications. As water-soluble compounds, they are preferably of interest for dyeing textile materials containing hydroxyl groups or nitrogen, in particular textile materials of natural and regenerated cellulose, and furthermore of wool, silk or synthetic polyamide or polyurethane fibres.

The materials mentioned are dyed or printed by the usual processes for reactive dyestuffs. Brilliant blue dyeings and prints which are fast to light and wet processing are obtained.

The temperature data in the examples are in °C. The formulae of the dyestuffs in the description and the examples are those of the free acids. The dyestuffs are generally isolated and used in the form of their alkali metal salts, in particular the sodium or potassium salts.

EXAMPLE 1

A. 9.0 g of 3-aminobenzenesulphonic acid are suspended in 90 ml of water. The pH value is adjusted to 3.5 and 7.1 g of cyanuric fluoride are added dropwise at 0°–5° in the course of 5 minutes. During this addition, the pH value is kept at 3.5 with 2 N sodium carbonate solution. After subsequently stirring the mixture for 10 minutes, the condensation reaction has ended.

B. The resulting solution is added dropwise to a solution, adjusted to pH 9, of 20.0 g of 1-amino-4-(4'-amino-cyclohexylamino)-anthraquinone-2,6-disulphonic acid in 140 ml of water at 0°–5° and the pH value of the reaction mixture is kept at 8.5–8.8 with 2 N sodium hydroxide solution. The mixture is stirred for a further 5 hours under the same conditions, the temperature is then allowed to rise to 20° and the resulting dyestuff of the formula

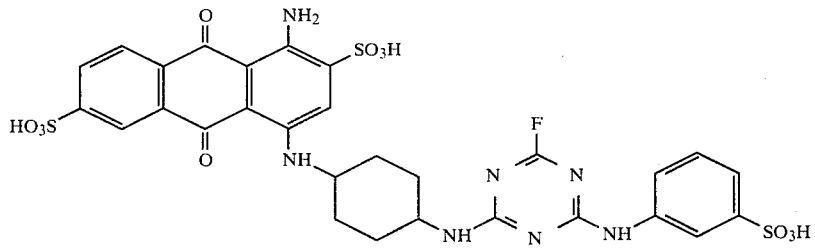

is salted out at pH 8.5 with 20% of potassium chloride in the course of 2–3 hours. The dyestuff is filtered off, washed with 20% strength potassium chloride solution and finally with 15% strength potassium chloride solution and dried at 40° in vacuo.

C. 50 g of cotton hanks are dyed in 1 liter of a dye liquor which contains 1.5 g of the above dyestuff by heating the bath to 40° in the course of 30 minutes, adding 50 g of sodium chloride in several portions, then adding 20 g of sodium carbonate and treating the hanks at this temperature for 60 minutes. After rinsing, soaping at the boil and drying, a very brilliant, blue dyeing of excellent fastness to light and wet processing is obtained.

EXAMPLE 2

A. 12.0 g of 2-aminobenzene-1,4-disulphonic acid are dissolved in 50 ml of water by adding 2 N sodium carbonate until the pH is 4.5. 7.2 g of cyanuric fluoride are added dropwise to the solution at 0°–5° in the course of 5–10 minutes and the pH value is kept at 4.2–4.7 with 2 N sodium carbonate solution. 15 minutes after the dropwise addition, the condensation reaction has ended.

B. The resulting solution of the reactive component is added dropwise to a solution, adjusted to pH 9, of 18.0 g of 1-amino-4-(4'-amino-cyclohexylamino)-anthraquinone-2,6-disulphonic acid in 180 ml of water at 0°–5° in the course of 30 minutes and the pH value of the reaction mixture is kept at 8.5–8.7 by adding 2 N sodium hydroxide solution. After 3 hours, the temperature is allowed to rise to 20°. Thereafter, the condensation reaction has ended. The dyestuff is salted out of the solution with 20% of potassium chloride. The product is filtered off and the filter cake is washed with 20% strength potassium chloride solution. The resulting dyestuff of the formula

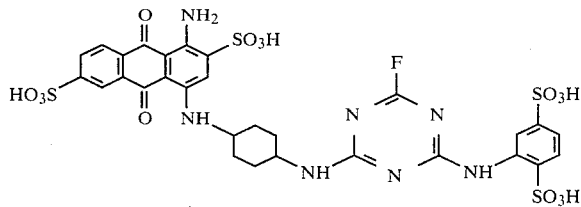

is dried at 40° in vacuo and gives, on cotton when used according to the dyeing process of Example 1 C, a brilliant blue dyeing with excellent fastness to light and wet processing.

C. 100 g of cotton fabric are padded on a padder at room temperature, in accordance with the cold batch process, with an aqueous solution which contains 30 g/liter of dyestuff and 20 g/liter of sodium carbonate, such that the liquor pick-up of the fabric is 80% of its dry weight. The fabric is rolled up and kept at b 25° for 24 hours such that no moisture can escape. The fabric is then rinsed, soaped at the boil and dried. A very brilliant blue dyeing which is fast to light and wet processing is obtained.

D. Cellulose fabric is printed, by a printing process, with a printing paste which contains 40 g of the above dyestuff, 100 g of urea, 300 ml of water, 500 g of alginate thickener and 20 g of sodium carbonate per kilogram and has been made up to 1 kilogram with water. The fabric is then dried, steamed at 105° for 2 minutes, rinsed with hot water and then soaped at the boil. After rinsing and drying, a brilliant, blue print with very good fastness to light and wet processing is obtained.

EXAMPLE 3

A. 10.8 g of 4-aminobenzene-1,3-disulphonic acid are dissolved, at pH 3.5, in 160 ml of water. 6.8 g of cyanuric fluoride are added dropwise to the solution at 0°–5° in the course of 5–10 minutes and the pH value is kept at 3.5–4.0 with 2 N sodium carbonate solution. The mixture is subsequently stirred for 15 minutes and the pH value is then adjusted to 4.5.

B. The solution of the reactive component obtained is added dropwise to 15.9 g of 1-amino-4-(4'-aminocyclohexylamino)-anthraquinone-2,7-disulphonic acid in 260 ml of water at 0°–5° and the pH value of the reaction mixture is kept at 8.6–8.8 with 2 N sodium hydroxide solution. When the condensation reaction has ended (monitoring by chromatography), the solution is warmed to 20° and the resulting dyestuff of the formula

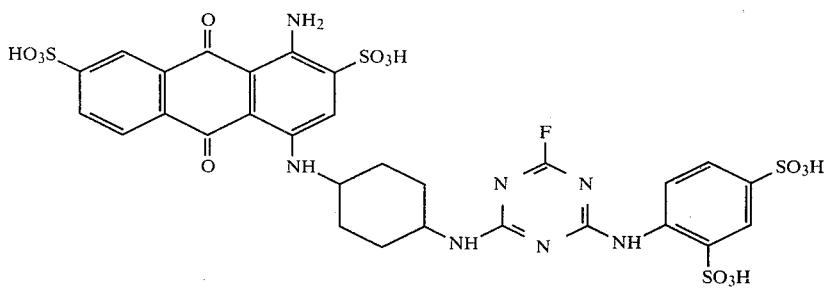

is salted out by adding 22% of potassium chloride. The precipitate is filtered off, washed with 25% strength potassium chloride solution and dried at 45° in vacuo.

Cellulose materials can also be dyed in the following manner, in addition to the methods described: 100 g of cotton fabric are padded at room temperature with an aqueous solution which contains 3% of the above dyestuff, 20 g/liter of sodium bicarbonate and 150 g/liter of urea, intermediately dried, heated to 140° for 2 minutes and then rinsed and soaped at the boil. The fabric is dyed in extremely brilliant blue shades which are fast to light and wet processing.

Other reactive dyestuffs which give brilliant blue dyeings and prints on cellulose fibres are obtained by subjecting the reactive components in Table I, which are prepared analogously to those in the preceding examples, to condensation reactions with the anthraquinone components indicated.

TABLE I

| No. | Reactive component | Anthraquinone component |
| --- | --- | --- |
| 4 | | |

TABLE I-continued

| No. | Reactive component | Anthraquinone component |
|---|---|---|
| 5 | difluorotriazinyl-guanidino-benzene-2,4-disulfonic acid | 1-amino-4-(4-aminocyclohexylamino)-anthraquinone-2,6,8-trisulfonic acid (structural drawing) |
| 6 | difluorotriazinyl-guanidino-benzene-2,5-disulfonic acid | 1-amino-4-(4-aminocyclohexylamino)-anthraquinone-2,5-disulfonic acid (structural drawing) |
| 7 | difluorotriazinyl-guanidino-benzenesulfonic acid | 1-amino-4-(4-aminocyclohexylamino)-anthraquinone-2,6-disulfonic acid (structural drawing) |
| 8 | difluorotriazinyl-guanidino-4-benzenesulfonic acid | 1-amino-4-(4-aminocyclohexylamino)-anthraquinone-2,5-disulfonic acid (structural drawing) |
| 9 | difluorotriazinyl-guanidino-methylbenzene-disulfonic acid | 1-amino-4-(4-aminocyclohexylamino)-anthraquinone-2,6-disulfonic acid (structural drawing) |
| 10 | difluorotriazinyl-guanidino-carboxy-benzenesulfonic acid | 1-amino-4-(4-aminocyclohexylamino)-anthraquinone-2,6-disulfonic acid (structural drawing) |
| 11 | difluorotriazinyl-guanidino-benzoic acid | 1-amino-4-(4-aminocyclohexylamino)-anthraquinone-2,6-disulfonic acid (structural drawing) |
| 12 | difluorotriazinyl-guanidino-methyl-benzenesulfonic acid | 1-amino-4-(4-aminocyclohexylamino)-anthraquinone-2,6-disulfonic acid (structural drawing) |
| 13 | difluorotriazinyl-guanidino-methyl-benzenesulfonic acid | 1-amino-4-(4-aminocyclohexylamino)-anthraquinone-2,6-disulfonic acid (structural drawing) |

TABLE I-continued

| No. | Reactive component | Anthraquinone component |
|---|---|---|
| 14 | difluorotriazinyl-NH-(4-methoxy-2-sulfophenyl) | 1-amino-2,7-disulfo-4-(4-aminocyclohexylamino)anthraquinone |
| 15 | difluorotriazinyl-NH-(4-acetamido-2-sulfophenyl) | 1-amino-2,7-disulfo-4-(4-aminocyclohexylamino)anthraquinone |
| 16 | difluorotriazinyl-NH-(4-chloro-2-sulfophenyl) | 1-amino-2,7-disulfo-4-[4-(2-hydroxyethylamino)cyclohexylamino]anthraquinone |
| 17 | difluorotriazinyl-NH-(4,8-disulfonaphth-2-yl) | 1-amino-2,7-disulfo-4-(4-aminocyclohexylamino)anthraquinone |
| 18 | difluorotriazinyl-NH-(1-sulfonaphth-2-yl) | 1-amino-2,7-disulfo-4-(3-aminocyclohexylamino)anthraquinone |
| 19 | difluorotriazinyl-NH-(5,7-disulfonaphth-2-yl) | 1-amino-2-sulfo-5-sulfo-4-(4-aminocyclohexylamino)anthraquinone |
| 20 | difluorotriazinyl-NH-(5,7-disulfonaphth-1-yl) | 1-amino-2,7-disulfo-4-(4-aminocyclohexylamino)anthraquinone |
| 21 | difluorotriazinyl-N(CH$_3$)-(3-sulfophenyl) | 1-amino-2,7-disulfo-4-(4-aminocyclohexylamino)anthraquinone |
| 22 | difluorotriazinyl-NH-(4-sulfophenyl) | 1-amino-2,7-disulfo-4-(4-aminocyclohexylamino)anthraquinone |

TABLE I-continued

| No. | Reactive component | Anthraquinone component |
|-----|-------------------|------------------------|
| 23 | 2,4-difluoro-1,3,5-triazin-6-yl-NH-(2-sulfophenyl) | 1-amino-2-sulfo-4-(4-aminocyclohexylamino)-6-sulfo-anthraquinone |
| 24 | 2,4-difluoro-1,3,5-triazin-6-yl-NH-(3,5-disulfophenyl) | 1-amino-2-sulfo-4-(4-aminocyclohexylamino)-6-sulfo-anthraquinone |
| 25 | 2,4-difluoro-1,3,5-triazin-6-yl-NH-(3-sulfophenyl) | 1-amino-2-sulfo-4-(4-aminocyclohexylamino)-5-sulfo-anthraquinone |
| 26 | 2,4-difluoro-1,3,5-triazin-6-yl-NH-(4-methoxy-3-sulfophenyl) | 1-amino-2-sulfo-4-(4-aminocyclohexylamino)-8-sulfo-anthraquinone |
| 27 | 2,4-difluoro-1,3,5-triazin-6-yl-NH-(3-sulfophenyl) | 1-amino-2-sulfo-4-(4-aminocyclohexylamino)-5-sulfo-anthraquinone |
| 28 | 2,4-difluoro-1,3,5-triazin-6-yl-NH-(4-methyl-3-sulfophenyl) | 1-amino-2-sulfo-4-(4-ethylaminocyclohexylamino)-5-sulfo-anthraquinone |
| 29 | 2,4-difluoro-1,3,5-triazin-6-yl-N(CH$_3$)-(2-methyl-5-sulfophenyl) | 1-amino-2-sulfo-4-(4-aminocyclohexylamino)-6-sulfo-anthraquinone |
| 30 | 2,4-difluoro-1,3,5-triazin-6-yl-NH-(3,6-disulfonaphthalen-2-yl) | 1-amino-2-sulfo-4-(3-aminocyclohexylamino)-6-sulfo-anthraquinone |
| 31 | 2,4-difluoro-1,3,5-triazin-6-yl-NH-(4-sulfophenyl) | 1-amino-2-sulfo-4-(4-aminocyclohexylamino)-6-sulfo-anthraquinone |

TABLE I-continued

| No. | Reactive component | Anthraquinone component |
|-----|-------------------|------------------------|
| 32 | 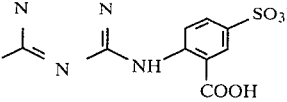 | 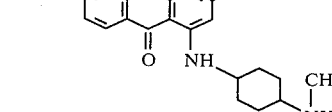 |
| 33 |  | 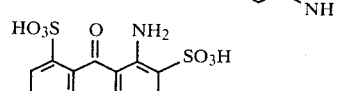 |
| 34 | 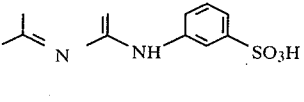 | 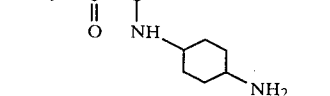 |
| 35 | 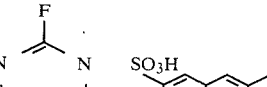 | 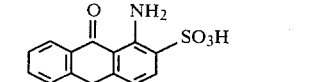 |
| 36 | 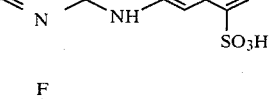 | 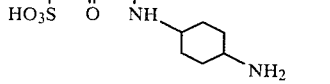 |

EXAMPLE 37

16.0 g of 1-amino-4-(4'-amino-cyclohexylamino)-anthraquinone-2,6-disulphonic acid are dissolved, at pH 9, in 240 ml of water. The solution is cooled to 0°–5° and 7.0 g of 2,4-difluoro-6-($\beta$-methoxyethoxy)-triazine are added dropwise at a constant rate in the course of 20–30 minutes. The pH value of the reaction mixture is kept at 8.5–8.7 by simultaneously metering in 2 N sodium hydroxide solution. After the dropwise addition of the reactive component, the mixture is subsequently stirred for a further 30 minutes and, when the condensation reaction has ended, the dyestuff is salted out with 20% of sodium chloride. The precipitate is filtered off and washed with 20% strength sodium chloride solution and the filter cake is dried at 40° in vacuo. The dyestuff of the formula

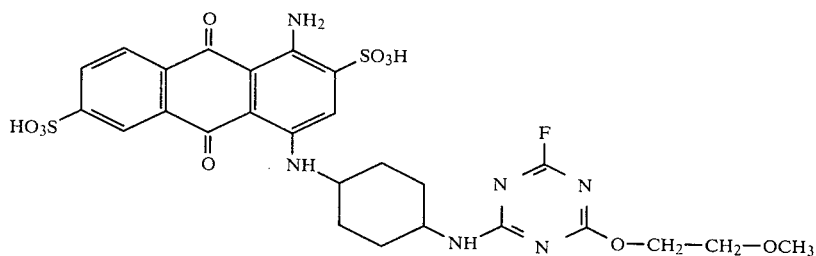

dyes cotton from a long liquor at 40°, in accordance with the process of Example 1 C, in clear, strong blue shades of excellent fastness to light and wet processing.

EXAMPLE 38

10.5 g of 1-amino-4-(4'-amino-cyclohexylamino)-anthraquinone-2,7-disulphonic acid are dissolved, at pH 9, in 200 ml of water. The solution is cooled to 5°–10° and 3.5 g of 2,4-difluoro-6-methoxytriazine are added dropwise in the course of 20 minutes. The pH value of the reaction mixture is kept at 8.5–8.7 with 1 N sodium hydroxide solution. The mixture is subsequently stirred at 5°–10° for 30 minutes, the temperature is then allowed to rise to 20° and the dyestuff of the formula

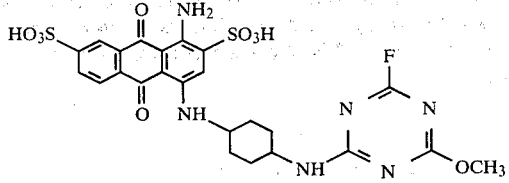

is salted out with 15% of sodium chloride. The product which has precipitated is filtered off and the filter cake is washed with 15% strength sodium chloride solution and dried at 40° in vacuo. The dyestuff dyes cotton from a long liquor, in accordance with the method of Example 1 C, in luminous blue shades which are very fast to light and wet processing.

EXAMPLE 39

15.0 g of 1-amino-4-(4'-amino-cyclohexylamino)-anthraquinone-2,6-disulphonic acid are dissolved, at pH 9 and at 20°, in 225 ml of water. 5.1 g of 2,4-difluoro-6-methylaminotriazine are introduced into the solution at 20° and the pH value is kept at 8.5–9.0 with 2 N sodium hydroxide solution. The mixture is subsequently stirred for 4 hours, 300 ml of 25% strength sodium chloride solution are then added dropwise to the reaction mixture, a further 60 g of sodium chloride is added and the dyestuff which has precipitated is filtered off. The product is washed with 15% strength sodium chloride solution and dried at 50° in vacuo.

The resulting dyestuff of the formula

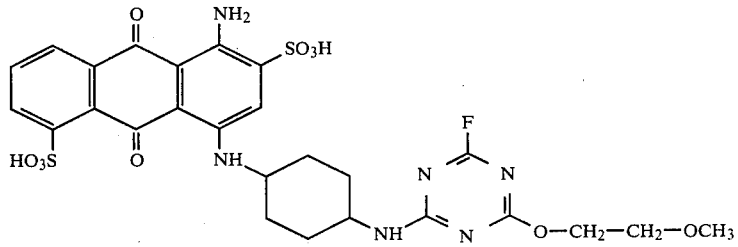

dyes cotton from a long liquor at 50° in clear blue shades with excellent fastness properties.

EXAMPLE 40

14.0 g of 1-amino-4-(4'-amino-cyclohexylamino)-anthraquinone-2,7-disulphonic acid are dissolved, at pH 9 and 20°, in 280 ml of water. 6.1 g of 2,4-difluoro-6-diethylamino-triazine are introduced into the solution in the course of 15 minutes and the pH value is kept at 8.7–9.0 with 2 N sodium hydroxide solution. The mixture is subsequently stirred under the conditions indicated for 12 hours, the dyestuff solution is then clarified from small amounts of residues of the reactive component, and 250 ml of 25% strength sodium chloride solution are then added dropwise to the filtrate. The dyestuff of the formula

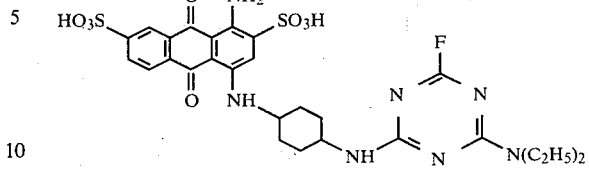

which has precipitated is filtered off, washed with 10% strength sodium chloride solution and dried at 50° in vacuo. On cotton, the dyestuff gives brilliant blue dyeings and prints which are fast to wet processing and light.

EXAMPLE 41

9.9 g of 1-amino-4-(4'-amino-cyclohexylamino)-anthraquinone-2,5-disulphonic acid are suspended in 250 ml of water and are dissolved, at pH 10.5, by adding 2 N sodium hydroxide solution. The solution is cooled to 0°–5° and 4.4 g of 2,4-difluoro-6-($\beta$-methoxyethoxy)-triazine are added dropwise in the course of 30 minutes. For the condensation reaction, the pH value is kept at 10–10.5 with 2 N sodium hydroxide solution. When the reaction has ended, the pH value is adjusted to 7–7.5 and the dyestuff is salted out with 30 g of sodium chloride. It is filtered off, washed with 15% strength sodium chloride solution and dried at 40° in vacuo.

The dyestuff of the formula

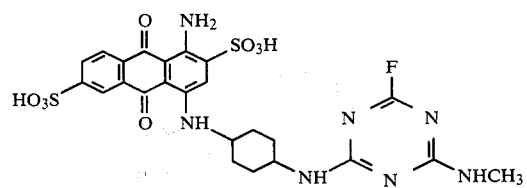

dyes cotton from a long liquor at 40°–50° in brilliant blue shades with excellent fastness properties.

EXAMPLE 42

12.0 g of 1-amino-4-(4'-amino-cyclohexylamino)-anthraquinone-2,6-disulphonic acid are dissolved in 250 ml of water and 14 ml of 2 N sodium hydroxide solution. The solution is cooled to 0°–5°, the pH value is adjusted to 9 and 5.7 g of 2,4-difluoro-6-anilinotriazine are added in the course of 20 minutes. During the addition and also afterwards, the pH value is kept at 8.5–9.0 with 2 N sodium hydroxide solution. After 3 hours, the temperature is allowed to rise slowly to 20°. When the condensation reaction has ended, the dyestuff is salted out by adding 25% strength sodium chloride solution, filtered off, washed with 5% strength sodium chloride solution and dried at 40° in vacuo. The dyestuff corresponds to the formula

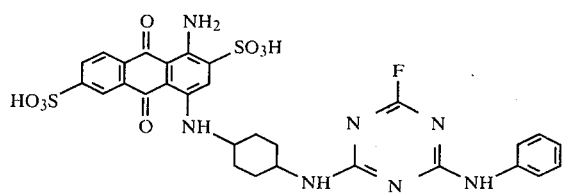

On cotton, from a long liquor at 40°–50°, it gives brilliant blue dyeings with excellent fastness to light and wet processing.

EXAMPLE 43

13.7 g of 1-amino-4-(4'-amino-cyclohexylamino)-anthraquinone-2,7-disulphonic acid are dissolved, at 20° and at pH 9, in 220 ml of water. 4.3 g of 2-amino-4,6-difluoro-triazine are introduced into the solution at 15°–20° in the course of 10 minutes and the pH value is kept at 8.5–8.7 with 2 N sodium hydroxide solution. To bring the condensation reaction to completion, the mixture is subsequently stirred at this pH value for 3 hours, and the dyestuff is then salted out with 15% of sodium chloride and filtered off and the filter cake is washed with 15% strength sodium chloride solution and dried at 45° in vacuo. The dyestuff corresponds to the formula

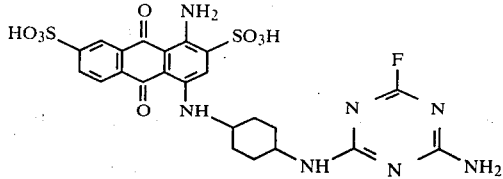

and gives clear, blue prints and dyeings on cellulose fibres.

Other reactive dyestuffs which give brilliant, blue dyeings and prints on cellulose fibres are obtained by subjecting the anthraquinone components and reactive components mentioned in Table II to condensation reactions:

TABLE II

| No. | Anthraquinone component | Reactive component |
|---|---|---|
| 44 | | |
| 45 | | |
| 46 | | |
| 47 | | |
| 48 | | |
| 49 | | |

TABLE II-continued

| No. | Anthraquinone component | Reactive component |
|---|---|---|
| 50 | 1-NH₂, 2-SO₃H, 7-HO₃S, 4-NH-(cyclohexyl)-NH₂ anthraquinone | difluorotriazine with –N(CH₃)(C₆H₅) |
| 51 | 1-NH₂, 2-SO₃H, 7-HO₃S, 4-NH-(cyclohexyl)-NH₂ anthraquinone | difluorotriazine with –NH–CH₂–CH₂–OH |
| 52 | 1-NH₂, 2-SO₃H, 7-HO₃S, 4-NH-(cyclohexyl)-NH₂ anthraquinone | difluorotriazine with –OC₂H₅ |
| 53 | 1-NH₂, 2-SO₃H, 7-HO₃S, 4-NH-(cyclohexyl)-NH₂ anthraquinone | difluorotriazine with –NH–CH₂–CH₂–SO₃H |
| 54 | 1-NH₂, 2-SO₃H, 7-HO₃S, 4-NH-(cyclohexyl)-NH₂ anthraquinone | difluorotriazine with –O–CH₂–CH₂–OCH₃ |
| 55 | 1-NH₂, 2-SO₃H, 7-HO₃S, 4-NH-(cyclohexyl)-NH₂ anthraquinone | difluorotriazine with –NH–(4-OCH₃-C₆H₄) |
| 56 | 1-NH₂, 2-SO₃H, 7-HO₃S, 4-NH-(cyclohexyl)-NH₂ anthraquinone | difluorotriazine with –NH–(4-Cl-C₆H₄) |
| 57 | 1-NH₂, 2-SO₃H, 7-HO₃S, 4-NH-(3-aminocyclohexyl) anthraquinone | difluorotriazine with –NH–(4-CH₃-C₆H₄) |
| 58 | 1-NH₂, 2-SO₃H, 7-HO₃S, 4-NH-(3-aminocyclohexyl) anthraquinone | difluorotriazine with –OCH₃ |

TABLE II-continued

| No. | Anthraquinone component | Reactive component |
|---|---|---|
| 59 | 1-NH₂, 2-SO₃H, 5-SO₃H, 4-NH-(4-aminocyclohexyl) anthraquinone | 2-F, 4-F, 6-[N(CH₃)(CH₂CH₂OH)]-1,3,5-triazine |
| 60 | 1-NH₂, 2-SO₃H, 7-SO₃H, 4-NH-(4-aminocyclohexyl) anthraquinone | 2-F, 4-F, 6-[N(CH₂CH₂OH)₂]-1,3,5-triazine |
| 61 | 1-NH₂, 2-SO₃H, 6-SO₃H, 4-NH-(4-aminocyclohexyl) anthraquinone | 2-F, 4-F, 6-[N(CH₃)(CH₂CH₂SO₃H)]-1,3,5-triazine |
| 62 | 1-NH₂, 2-SO₃H, 6-SO₃H, 4-NH-(4-aminocyclohexyl) anthraquinone | 2-F, 4-F, 6-[NH-C₆H₄-NHCOCH₃]-1,3,5-triazine |
| 63 | 1-NH₂, 2-SO₃H, 5-SO₃H, 4-NH-(4-aminocyclohexyl) anthraquinone | 2-F, 4-F, 6-OCH₃-1,3,5-triazine |
| 64 | 1-NH₂, 2-SO₃H, 6-SO₃H, 4-NH-(4-aminocyclohexyl) anthraquinone | 2-F, 4-F, 6-[NH-(2-methoxyphenyl)]-1,3,5-triazine |
| 65 | 1-NH₂, 2-SO₃H, 8-SO₃H, 4-NH-(4-aminocyclohexyl) anthraquinone | 2-F, 4-F, 6-N(C₂H₅)₂-1,3,5-triazine |
| 66 | 1-NH₂, 2-SO₃H, 7-SO₃H, 4-NH-(4-aminocyclohexyl) anthraquinone | 2-F, 4-F, 6-N(CH₃)₂-1,3,5-triazine |
| 67 | 1-NH₂, 2-SO₃H, 7-SO₃H, 4-NH-(4-aminocyclohexyl) anthraquinone | 2-F, 4-F, 6-O-C₃H₇-1,3,5-triazine |

TABLE II-continued

| No. | Anthraquinone component | Reactive component |
|---|---|---|
| 68 | 1-NH₂, 2-SO₃H, 4-NH-cyclohexyl-NH₂, 7-SO₃H anthraquinone | difluorotriazinyl-NH-C(=N-)NH-CH₂-CH₂-OSO₃H |
| 69 | 1-NH₂, 2-SO₃H, 4-NH-cyclohexyl-NH₂, 7-SO₃H anthraquinone | difluorotriazinyl-NH-C(=N-)NH-(3-SO₂NH₂-phenyl) |
| 70 | 1-NH₂, 2-SO₃H, 4-NH-cyclohexyl-NH₂, (6/7)-SO₃H anthraquinone | difluorotriazinyl-NH-C(=N-)NH-(3-Cl-phenyl) |
| 71 | 1-NH₂, 2-SO₃H, 4-NH-cyclohexyl-NH₂, 7-SO₃H anthraquinone | difluorotriazinyl-O-(CH₂)₆-OH |
| 72 | 1-NH₂, 2-SO₃H, 4-NH-cyclohexyl-NH₂, 7-SO₃H anthraquinone | difluorotriazinyl-N(CH₃)(phenyl) |
| 73 | 1-NH₂, 2-SO₃H, 4-NH-cyclohexyl-NH₂, 5-SO₃H anthraquinone | difluorotriazinyl-N(CH₃)(phenyl) |
| 74 | 1-NH₂, 2-SO₃H, 4-NH-cyclohexyl-NH₂, SO₃H anthraquinone (6/7-isomer mixture) | difluorotriazinyl-phenyl |
| 75 | 1-NH₂, 2-SO₃H, 4-N(CH₃)-cyclohexyl-NH₂, 7-SO₃H anthraquinone | difluorotriazinyl-NH-C₃H₇ |
| 76 | 1-NH₂, 2-SO₃H, 4-NH-cyclohexyl-NH₂, 7-SO₃H anthraquinone | difluorotriazinyl-O-CH₂-CH₂OH |

TABLE II-continued

| No. | Anthraquinone component | Reactive component |
|-----|------------------------|-------------------|
| 77 | 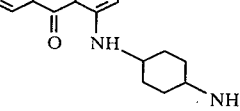 | 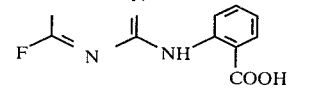 |
| 78 | 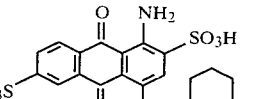 | 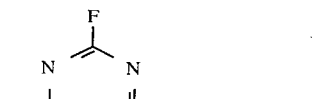 |
| 79 | 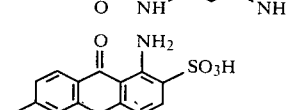 | 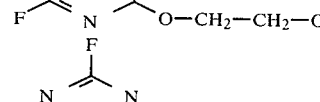 |
| 80 | 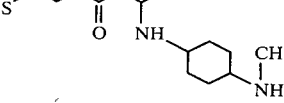 | 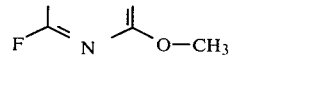 |
| 81 | 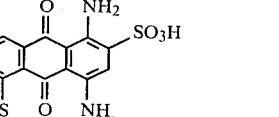 | 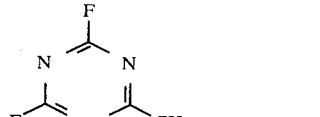 |
| 82 | 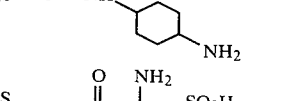 | 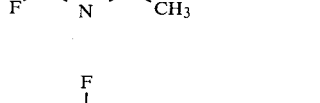 |

We claim:
1. Dyestuffs of the formula

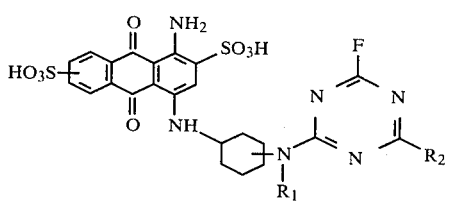

wherein
$R_1$ = H, $C_1$-$C_4$-alkyl or $C_1$-$C_4$-alkyl substituted by OH, OSO$_3$H, SO$_3$H or COOH
$R_2$ = amino, mono-$C_1$-$C_4$-alkylamino, di-$C_1$-$C_4$-alkylamino; amino or mono-$C_1$-$C_4$-alkylamino substituted by di-$C_1$-$C_4$-alkylamino substituted by OH or SO$_3$H;
OH, SO$_3$H, OSO$_3$H, phenyl; $C_1$-$C_4$-alkyl, $C_1$-$C_4$-alkyl substituted by methyl, ethyl, halogen, methoxy or ethoxy;
aryl; aryl substituted by methyl, ethyl, halogen, methoxy or ethoxy;
$C_1$-$C_6$-alkoxy;
$C_1$-$C_6$ alkoxy substiuted by OH or $C_1$-$C_6$-alkoxy; or wherein

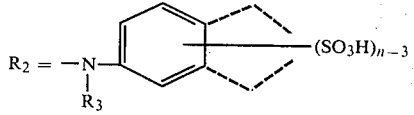

wherein
$R_3$ = H; $C_1$-$C_4$-alkyl or $C_1$-$C_4$-alkyl substituted by OH, SO$_3$H, OSO$_3$H.
2. Dyestuffs according to claim 1, wherein $R_1$ = H or $C_1$-$C_4$-alkyl.
3. Dyestuffs of the formula

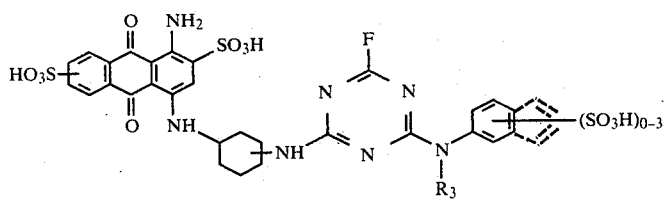

wherein
 $R_3$ = H or $C_1$-$C_2$-alkyl.

4. Dyestuffs of the formula

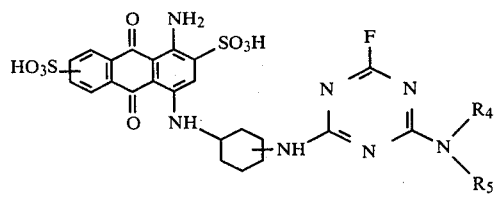

wherein
 $R_4$ and $R_5$ = H or $C_1$-$C_4$-alkyl optionally substituted by —OH, —SO$_3$H or —OSO$_3$H.

5. Dyestuffs of the formula

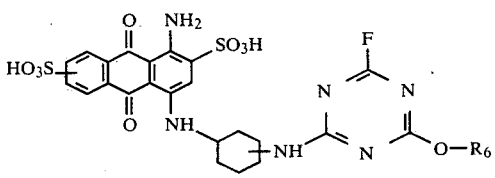

wherein
 $R_6$ = $C_1$-$C_6$-alkyl optionally substituted by methoxy or hydroxy.

6. Fibre materials dyed or printed with the dyestuffs of claim 1.

7. A method for dyeing and printing fibre materials containing hydroxyl groups or amide groups which comprises applying to said fibre materials a dyestuff of claim 1.

* * * * *

UNITED STATES PATENT AND TRADEMARK OFFICE
CERTIFICATE OF CORRECTION

PATENT NO. : 4,332,938
DATED : Jun. 1, 1982
INVENTOR(S) : Wolfgang Harms et al

It is certified that error appears in the above—identified patent and that said Letters Patent is hereby corrected as shown below:

Column 28, line 56, Delete "n-3" and insert --O-3--.

Signed and Sealed this

Twenth-eighth Day of September 1982

[SEAL]

Attest:

GERALD J. MOSSINGHOFF

Attesting Officer          Commissioner of Patents and Trademarks